United States Patent
Lee et al.

(10) Patent No.: US 11,345,023 B2
(45) Date of Patent: May 31, 2022

(54) MODULAR ROBOT AND OPERATION METHOD THEREOF

(71) Applicant: LG ELECTRONICS INC., Seoul (KR)

(72) Inventors: Junghyun Lee, Seoul (KR); Jeongho Park, Seoul (KR); Ikhee Jo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 122 days.

(21) Appl. No.: 16/984,843

(22) Filed: Aug. 4, 2020

(65) Prior Publication Data

US 2021/0213604 A1    Jul. 15, 2021

(30) Foreign Application Priority Data

Jan. 15, 2020    (KR) .................. 10-2020-0005380

(51) Int. Cl.
| | |
|---|---|
| *B25J 9/08* | (2006.01) |
| *B25J 17/00* | (2006.01) |
| *B25J 3/00* | (2006.01) |
| *B25J 9/16* | (2006.01) |

(52) U.S. Cl.
CPC . *B25J 9/08* (2013.01); *B25J 3/00* (2013.01); *B25J 9/161* (2013.01); *B25J 9/1617* (2013.01); *B25J 17/00* (2013.01)

(58) Field of Classification Search
CPC .................. B25J 9/08; B25J 9/16; B25J 17/00
See application file for complete search history.

(56) References Cited

U.S. PATENT DOCUMENTS

| | | | |
|---|---|---|---|
| 2005/0142033 A1* | 6/2005 | Glezer .................. | G01N 21/66 422/400 |
| 2019/0109086 A1* | 4/2019 | Li ......................... | H01L 23/544 |
| 2020/0306986 A1* | 10/2020 | Keraly ..................... | B25J 19/02 |

* cited by examiner

*Primary Examiner* — Kira Nguyen
(74) *Attorney, Agent, or Firm* — Birch, Stewart, Kolasch & Birch, LLP

(57) ABSTRACT

A modular robot can include a first connection device including a first contact array composed of at least one electrode; a driving device configured to implement movement of the modular robot; and a processor configured to control the first connection device and the driving device, detect fastening of the first connection device with a second connection device of a module device, the second connection device including a second contact array composed of at least one electrode, and in response to identifying the module device based on a contact pattern formed based on the first contact array being in contact with the second contact array, activate at least one of a function of the driving device or a function of the module device.

20 Claims, 12 Drawing Sheets

MODULAR ROBOT AND OPERATION METHOD THEREOF

CROSS REFERENCE TO RELATED APPLICATIONS

The present application claims priority to Korean Patent Application No. 10-2020-0005380 filed in the Republic of Korea on Jan. 15, 2020, the entire contents of which is incorporated herein for all purposes by this reference.

BACKGROUND

Embodiments of the present disclosure relate to a modular robot and more particularly to a modular robot for recognizing the mounting of a module device and an operation method thereof.

In general, a robot is a machine capable of automatically performing given tasks or operating by its own capabilities. The fields of application of the robot are generally divided into a robot for industrial use, medical use, space use, submarine use, etc.

Recently, a modular robot is being developed which can be coupled to other robots in order to solve a limited task performance ability of a small robot specialized for service purposes. Such a modular robot is not only utilized as an independent entity but can also expand its functionality in cooperation with other coupled robots. To this end, the modular robot establishes communication with other robots which are a cooperation target and then transmits and receives predetermined signals, thereby determining whether or not the modular robot is coupled to other robots.

In other words, a communication circuit must be necessarily provided within the robot to establish communication with other robots. Accordingly, the manufacturing cost of the robot is increased and the size of the robot is increased.

SUMMARY

The object of the present disclosure is to provide a modular robot which determines whether or not the modular robot is coupled to other robots which are a cooperation target even without establishing communication with the other robots.

The technical problem to be overcome in the present disclosure is not limited to the above-mentioned technical problems. Other technical problems not mentioned can be clearly understood from those described below by a person having ordinary skill in the art.

One embodiment is a modular robot which includes: a first connection device including a first contact array composed of at least one electrode; a driving device which is configured to implement movement of the modular robot; and a processor which is configured to control the first connection device and the driving device. The processor may be configured to control such that the modular robot detects fastening of the first connection device and a second connection device of a module device including a second contact array composed of at least one electrode, identifies the module device based on a contact pattern of the first contact array in contact with the second contact array, and controls at least one of functions of the driving device and the module device based on the identification.

Another embodiment is an operation method of the modular robot. The operation method includes: detecting fastening of a first connection device of the modular robot, which includes a first contact array, and a second connection device of a module device, which includes a second contact array; identifying the module device based on a contact pattern of the first contact array in contact with the second contact array; and controlling at least one of a function of the modular robot and a function of the module device based on the identification.

The modular robot according to the embodiments of the present disclosure detects connection of a module device by using a contact array composed of a plurality of electrodes which provide a magnetic force, thereby enabling the coupling and identification of the module device even without establishing communication with the module device. Also, the modular robot according to the embodiment of the present disclosure does not have to include a communication circuit for establishing communication with the module device, so that the manufacturing cost and size of the modular robot can be reduced.

Advantageous effects that can be obtained from the present disclosure is not limited to the above-mentioned effects. Further, other unmentioned effects can be clearly understood from the following descriptions by those skilled in the art to which the present disclosure belongs.

DETAILED DESCRIPTION OF THE EMBODIMENTS

Figure 1:
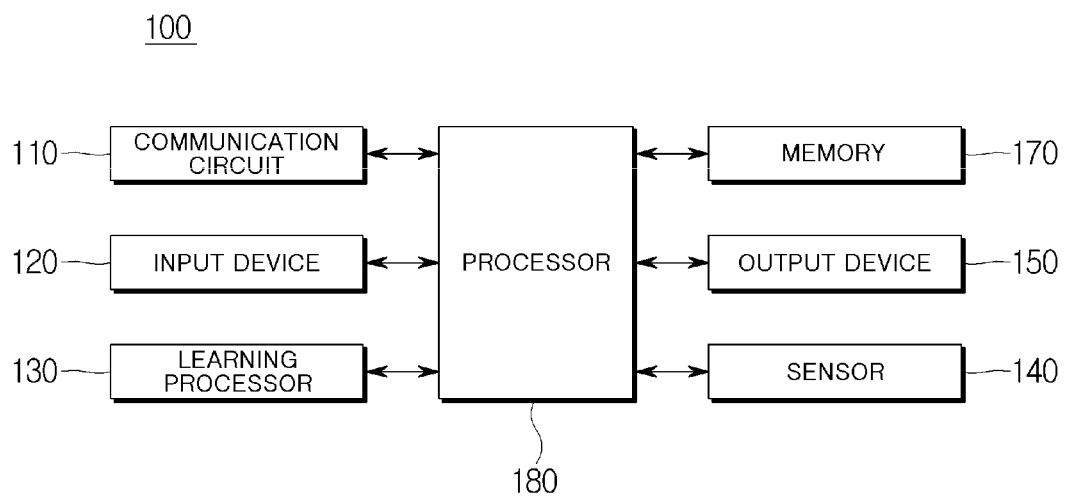
FIG. 1 shows an artificial intelligence (AI) device according to an embodiment of the present disclosure.

Hereinafter, embodiments of the present disclosure will be described with reference to the accompanying drawings.

Artificial intelligence refers to a field of studying artificial intelligence or methodology for making artificial intelligence, and machine learning refers to a field of defining various issues dealt with in the field of artificial intelligence and studying methodology for solving the various issues. The machine learning is defined as an algorithm that enhances the performance of a certain task through steady experience with the certain task.

An artificial neural network (ANN) is a model used in the machine learning and may mean all of the models which have a problem-solving ability and are composed of artificial neurons (nodes) that form a network by synaptic connection. The artificial neural network may be defined by a connection pattern between neurons of different layers, a learning process for updating model parameters, and an activation function for generating an output value.

The artificial neural network may include an input layer and an output layer, and optionally one or more hidden layers. Each layer includes one or more neurons, and the artificial neural network may include a synapse that connects a neuron to a neuron. Each neuron in the artificial neural network may output a function value of an activation function for input signals, a weight, and a bias input through the synapse.

The model parameter means a parameter determined by learning and includes the weight of the synaptic connection and bias of the neuron, etc. In addition, a hyper parameter means a parameter to be set before learning in a machine learning algorithm, and includes a learning rate, the number of times of the repetition, a mini batch size, an initialization function, and the like.

The purpose of the learning of the artificial neural network is regarded as determining a model parameter that minimizes a loss function. The loss function may be used as an index for determining an optimal model parameter in the learning process of the artificial neural network.

The machine learning may be classified into supervised learning, unsupervised learning, and reinforcement learning based on a learning method.

The supervised learning may refer to a method of training the artificial neural network in a state in which a label for learning data is given. The label may mean a correct answer (or a result value) that the artificial neural network infers when the learning data is input to the artificial neural network. The unsupervised learning may refer to a method of training the artificial neural network in a state in which a label for learning data is not given. The reinforcement learning may refer to a learning method of training an agent defined in a certain environment to select a behavior or a behavior sequence that maximizes the cumulative reward in each state.

Machine learning, which is implemented by a deep neural network (DNN) including a plurality of hidden layers of the artificial neural networks, is called deep learning, and the deep learning is part of the machine learning. Hereinafter, the machine learning is used as a meaning including the deep running.

A robot may refer to a machine that automatically processes or operates a given task by its own ability. In particular, a robot having a function of recognizing an environment, of making a self-determination, and of performing operation may be referred to as an intelligent robot.

Robots may be classified into industrial robots, medical robots, home robots, military robots, and the like according to the use purpose or field.

The robot can be equipped with a manipulator including an actuator or a driving device and can perform various physical operations such as moving a robot joint. In addition, a movable robot may include a wheel, a brake, a propeller, and the like and may travel on the ground or fly in the air.

Autonomous driving refers to a technology enabling a vehicle to travel on its own accord. An autonomous vehicle refers to a vehicle that travels without a user's operation or with a minimum manipulation of the user.

For example, the autonomous driving may include a technology for maintaining a lane while driving, a technology for automatically controlling a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having both an internal combustion engine and an electric motor, and an electric vehicle having only an electric motor, and may include not only an automobile but also a train, a motorcycle, and the like.

Here, the autonomous vehicle may be regarded as a robot having an autonomous driving function.

Virtual reality (VR), augmented reality (AR), and mixed reality (MR) are collectively referred to as extended reality. The VR technology provides a real-world object and background only in the form of a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

An XR technology may be applied to a head-mount display (HMD), a head-up display (HUD), a mobile phone, a tablet PC, a laptop computer, a desktop computer, a TV, a digital signage, and the like. A device to which the XR technology is applied may be referred to as an XR device.

FIG. 1 shows an AI device 100 according to an embodiment of the present disclosure.

The AI device 100 may be implemented by a stationary device or a mobile device, such as a TV, a projector, a mobile phone, a smartphone, a desktop computer, a laptop, a digital broadcasting terminal, a personal digital assistant (PDA), a portable multimedia player (PMP), a navigation system, a tablet PC, a wearable device, a set-top box (STB), a DMB receiver, a radio, a washing machine, a refrigerator, a desktop computer, a digital signage, a robot, a vehicle, and the like.

Referring to FIG. 1, the terminal 100 may include a communication circuit 110, an input device 120, a learning processor 130, a sensor 140, an output device 150, a memory 170, and a processor 180.

The communication circuit 110 may transmit and receive data to and from external devices such as other AI devices 100a to 100e or an AI server 200 by using wire/wireless communication technology. For example, the communication circuit 110 may transmit and receive sensor information, a user input, a learning model, and a control signal, etc., to and from external devices.

Here, the communication technology used by the communication circuit 110 includes Global System for Mobile communication (GSM), Code Division Multi Access (CDMA), Long Term Evolution (LTE), fifth generation communication (5G), Wireless LAN (WLAN), Wireless Fidelity (Wi-Fi), BLUETOOTH™, Radio Frequency Identification (RFID), Infrared Data Association (IrDA), ZIGBEE, Near Field Communication (NFC), and the like.

The input device 120 may obtain various types of data.

Here, the input device 120 may include a camera for inputting an image signal, a microphone for receiving an audio signal, and a user input unit for receiving information from a user. Here, the camera or the microphone may be treated as a sensor, and the signal obtained from the camera or the microphone may be referred to as sensing data or sensor information.

The input device 120 may obtain a learning data for model learning and an input data, etc., to be used when an output is obtained by using the learning model. The input device 120 may obtain raw input data. In this case, the processor 180 or the learning processor 130 may extract an input feature by preprocessing the input data.

The learning processor 130 may train a model composed of the artificial neural networks by using the learning data. Here, the trained artificial neural network may be referred to as a learning model. The learning model may be used to infer a result value for a new input data instead of the learning data, and the inferred value may be used as a basis for determination to perform a certain operation.

Here, the learning processor 130 may perform AI processing together with a learning processor 240 of the AI server 200.

Here, the learning processor 130 may include a memory integrated or implemented in the AI device 100. Alternatively, the learning processor 130 may be implemented by using the memory 170, an external memory directly coupled to the AI device 100, or a memory maintained in an external device.

The sensor 140 may obtain at least one of information on the inside of the AI device 100, information on ambient environment of the AI device 100, and user information by using various sensors.

Here, a sensor included in the sensor 140 may be a proximity sensor, an illuminance sensor, an acceleration sensor, a magnetic sensor, a gyro sensor, an inertial sensor, an RGB sensor, an IR sensor, a fingerprint sensor, an ultrasonic sensor, an optical sensor, a microphone, a lidar, and a radar, etc.

The output device 150 may generate an output related to a visual sense, an auditory sense, or a tactile sense.

Here, the output device 150 may include a display for visually outputting information, a speaker for acoustically outputting information, and a haptic actuator for tactually outputting information. For example, the display may output images or videos, the speaker may output voice or sound, and the haptic actuator may cause vibration.

The memory 170 may store data that supports various functions of the AI device 100. For example, the memory 170 may store input data obtained by the input device 120, learning data, a learning model, a learning history, etc.

The processor 180 may determine at least one executable operation of the AI device 100 based on information that is determined or generated by using a data analysis algorithm or the machine learning algorithm. The processor 180 may control the components of the AI device 100 and perform the determined operation.

To this end, the processor 180 may request, search, receive, or utilize data of the learning processor 130 or the memory 170. The processor 180 may control the components of the AI device 100 such that operations which are predicted or are determined to be desirable among the at least one executable operation are performed.

Here, when the processor 180 needs to be associated with an external device in order to perform the determined operation, the processor 180 may generate a control signal for controlling the corresponding external device and transmit the generated control signal to the corresponding external device.

The processor 180 may obtain intention information for the user input and may determine user's requirements based on the obtained intention information.

Here, the processor 180 may obtain intention information corresponding to the user input by using at least one of a speech to text (STT) engine for converting voice input into a text string or a natural language processing (NLP) engine for obtaining intention information of a natural language.

Here, at least a portion of at least one of the STT engine or the NLP engine may be composed of an artificial neural network trained according to the machine learning algorithm. At least one of the STT engine or the NLP engine may be trained by the learning processor 130, may be trained by the learning processor 240 of the AI server 200, or may be trained by their distributed processing.

The processor 180 may collect history information including operation contents of the AI device 100 or a user's feedback on the operation, and the like, and store the history information in the memory 170 or in the learning processor 130, or transmit the history information to the external device such as the AI server 200, etc. The collected history information may be used to update the learning model.

The processor 180 may control at least some of the components of the electronic device 100 in order to execute an application program stored in the memory 170. In addition, the processor 180 may operate two or more of the components included in the AI device 100 in combination with each other in order to execute the application program.

Figure 2:
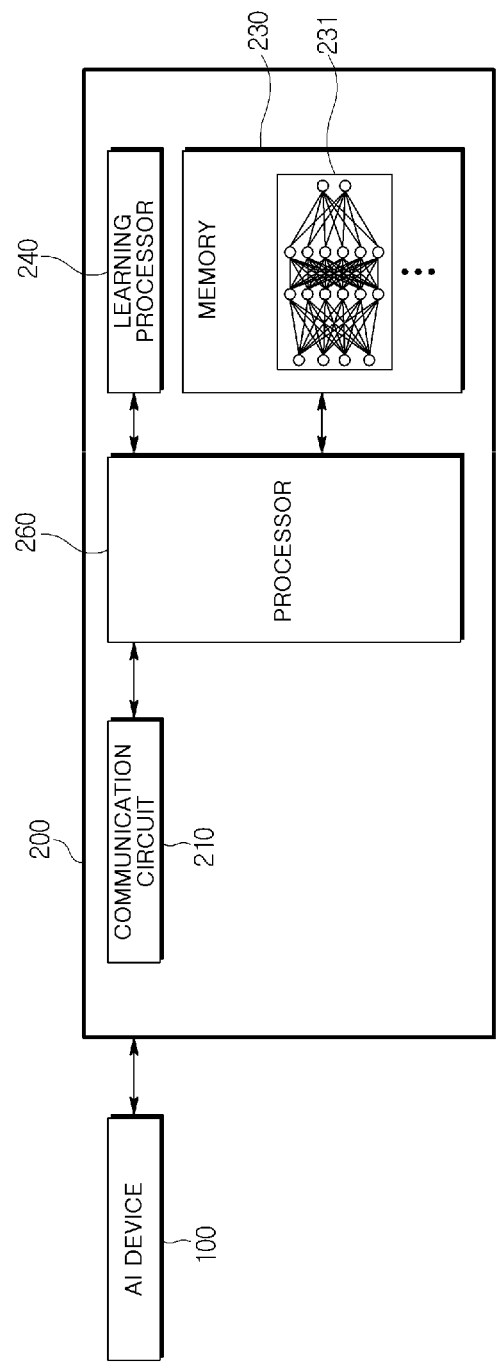
FIG. 2 shows an AI server according to the embodiment of the present disclosure.

FIG. 2 shows an AI server 200 according to the embodiment of the present disclosure. Referring to FIG. 2, the AI server 200 may mean a device which trains the artificial neural network by using the machine learning algorithm or mean a device which uses the trained artificial neural network. Here, the AI server 200 may be composed of a plurality of servers to perform distributed processing or may be defined as a 5G network. Here, the AI server 200 may be included as a component of the AI device 100, and may perform at least a portion of the AI processing together.

The AI server 200 may include a communication circuit 210, a memory 230, the learning processor 240, a processor 260, and the like.

The communication unit 210 may transmit and receive data to and from an external device such as the AI device 100.

The memory 230 may store a model (or an artificial neural network 231) which is being trained or has been trained through the learning processor 240.

The learning processor 240 may train the artificial neural network 231 by using the learning data. The learning model may be used with being mounted on the AI server 200 of the artificial neural network or with being mounted on the external device such as the AI device 100.

The learning model may be implemented in hardware, software, or by a combination of hardware and software. When the learning model is partially or wholly implemented in software, one or more instructions constituting the learning model may be stored in the memory 230.

The processor 260 may infer a result value for a new input data by using the learning model and may generate responses or control commands based on the inferred result value.

Figure 3:
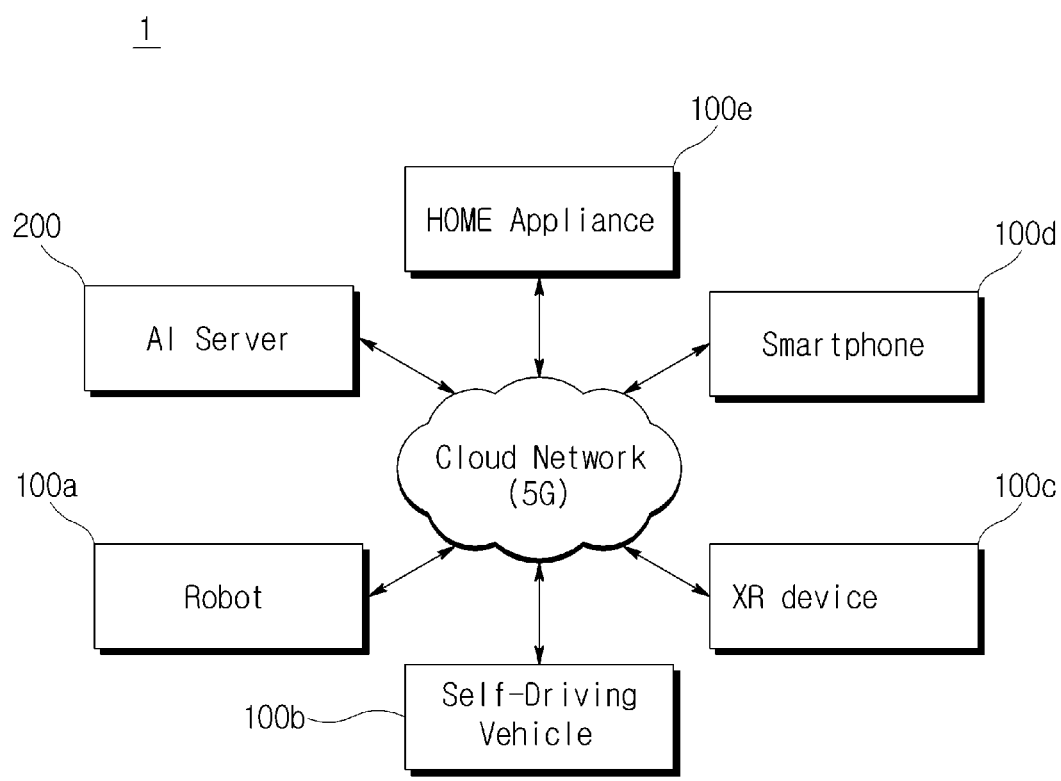
FIG. 3 shows an AI system according to the embodiment of the present disclosure.

FIG. 3 shows an AI system 1 according to the embodiment of the present disclosure.

Referring to FIG. 3, in the AI system 1, one or more of the AI server 200, a robot 100a, an autonomous vehicle 100b, an XR device 100c, a smartphone 100d, or a home appliance 100e are connected to a cloud network 10. Here, the robot 100a, the autonomous vehicle 100b, the XR device 100c, the smartphone 100d, or the home appliance 100e, to which an AI technology is applied, may be referred to as AI devices 100a to 100e.

The cloud network 10 may mean a network which forms a part of a cloud computing infrastructure or exists within the cloud computing infrastructure. Here, the cloud network 10 may be configured with a 3G network, a 4G or long-term evolution (LTE) network, or a 5G network, etc.

That is, the respective devices 100a to 100e and 200 constituting the AI system 1 may be connected to each other through the cloud network. The respective devices 100a to 100e and 200 can communicate with each other through base stations, and also, they can communicate directly with each other without base stations.

The AI server 200 may include a server which performs artificial intelligence processing and a server which performs operations on big data.

The AI server 200 may be connected through the cloud network 10 to at least one of the robot 100a, the autonomous vehicle 100b, the XR device 100c, the smartphone 100d, or the home appliance 100e which are AI devices that constitute the AI system 1. The AI server 200 may support at least a portion of the artificial intelligence processing of the connected AI devices 100a to 100e.

Here, the AI server 200 in lieu of the AI devices 100a to 100e may train the artificial neural network in accordance with the machine learning algorithm and may directly store the learning model or transmit to the AI devices 100a to 100e.

Here, the AI server 200 may receive input data from the AI devices 100a to 100e, may infer a result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate a response or a control command based on the inference result value.

Hereinafter, various embodiments of the AI devices 100a to 100e to which the above-described technology is applied will be described. The AI devices 100a to 100e shown in FIG. 3 may be regarded as a specific embodiment of the AI device 100 shown in FIG. 1.

The AI technology is applied to the robot 100a and the robot 100a may be implemented as a guide robot, a transport robot, a cleaning robot, a wearable robot, an entertainment robot, a pet robot, an unmanned flying robot, or the like.

The robot 100a may include a robot control module for controlling its operations, and the robot control module may mean a software module or may mean a chip obtained by implementing the software module by hardware.

The robot 100a uses sensor information obtained from various kinds of sensors, thereby obtaining the state information of the robot 100a, detecting (recognizing) ambient environment and objects, generating map data, determining a travel path and a driving plan, determining a response to user interaction, or determining the operation.

Here, in order to determine the travel path and the driving plan, the robot 100a may use the sensor information obtained from at least one sensor among a lidar, a radar, and a camera.

The robot 100a may perform the above operations by using the learning model composed of at least one artificial neural network. For example, the robot 100a may recognize ambient environment and objects by using the learning model and may determine the operation by using information on the recognized ambient environment or the recognized object. Here, the learning model may be trained directly by the robot 100a or may be trained by external devices such as the AI server 200, etc.

Here, the robot 100a may perform the operation by producing a result through the direct use of the learning model and may also perform the operation by transmitting the sensor information to external devices such as the AI server 200, etc., and by receiving the result produced accordingly.

The robot 100a may use at least one of the map data, the object information detected from the sensor information, or the object information obtained from the external device to determine the travel path and the driving plan, and may be made to travel along the determined travel path and driving plan by controlling a driving unit.

The map data may include object identification information on various objects disposed in a space where the robot 100a moves. For example, the map data may include the object identification information on fixed objects such as a wall, a door, etc., and movable objects such as a flowerpot, a desk, etc. Also, the object identification information may include names, types, distances, locations, etc.

Also, the robot 100a may perform the operation or travel by controlling the driving unit based on the control/interaction of the user. Here, the robot 100a may obtain intent information of the interaction according to the action or voice utterance of the user and may determine a response based on the obtained intent information and perform the operation.

The AI technology is applied to the autonomous vehicle 100b, and the autonomous vehicle 100b may be implemented as a mobile robot, a vehicle, an unmanned flying vehicle, or the like.

The autonomous vehicle 100b may include an autonomous driving control module for controlling an autonomous driving function, and the autonomous driving control module may mean a software module or a chip obtained by implementing the software module by hardware. The autonomous driving control module may be included in the autonomous vehicle 100b as a component thereof, or may be connected to the autonomous vehicle 100b as a separate external hardware.

The autonomous vehicle 100b uses sensor information obtained from various kinds of sensors, thereby obtaining the state information of the autonomous vehicle 100b, detecting (recognizing) ambient environment and objects, generating map data, determining a travel path and a driving plan, or determining the operation.

Here, in order to determine the travel path and the driving plan, the autonomous vehicle 100b, as with the robot 100a, may use the sensor information obtained from at least one sensor among the lidar, the radar, and the camera.

In particular, the autonomous vehicle 100b may recognize environment or objects of an area where a view is blocked or an area spaced apart by a distance larger than a certain distance, by receiving the sensor information from s, or may receive the information directly recognized by external devices.

The autonomous vehicle 100b may perform the above operations by using the learning model composed of at least one artificial neural network. For example, the autonomous vehicle 100b may recognize ambient environment and objects by using the learning model and may determine a driving line by using information on the recognized ambient environment or the recognized object. Here, the learning model may be trained directly by the autonomous vehicle 100b or may be trained by external devices such as the AI server 200, etc.

Here, the autonomous vehicle 100b may perform the operation by producing a result through the direct use of the learning model and may also perform the operation by transmitting the sensor information to external devices such as the AI server 200, etc., and by receiving the result produced accordingly.

The autonomous vehicle 100b may use at least one of the map data, the object information detected from the sensor information, or the object information obtained from the external device to determine the travel path and the driving plan, and may be made to travel along the determined travel path and driving plan by controlling a driving unit.

The map data may include object identification information on various objects disposed in a space (e.g., a road) where the autonomous vehicle 100b travels. For example, the map data may include the object identification information on fixed objects such as a street light, rock, buildings, etc., and movable objects such as vehicles, pedestrians, etc. Also, the object identification information may include names, types, distances, locations, etc.

Also, the autonomous vehicle 100b may perform the operation or travel by controlling the driving unit based on the control/interaction of the user. Here, the autonomous vehicle 100b may obtain intent information of the interaction according to the action or voice utterance of the user and may determine a response based on the obtained intent information and perform the operation.

The AI technology is applied to the XR device 100c and the XR device 100c may be implemented as a head-mount display (HMD), a head-up display (HUD) provided in the vehicle, a television, a mobile phone, a smartphone, a computer, a wearable device, a home appliance, a digital signage, a vehicle, a stationary robot, a mobile robot, or the like.

The XR device 100c may analyze three-dimensional point cloud data or image data obtained from various sensors or the external devices, and may generate position data and attribute data for the three-dimensional points, thereby obtaining information on the surrounding space or the real object, and rendering and outputting an XR object to be output. For example, the XR device 100c may cause the XR object including additional information on the recognized object to be output in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. Here, the learning model may be directly trained by the XR device 100c, or may be trained by the external device such as the AI server 200.

Here, the XR device 100c may perform the operation by producing a result through the direct use of the learning model and may also perform the operation by transmitting the sensor information to external devices such as the AI server 200, etc., and by receiving the result produced accordingly.

The AI technology and an autonomous driving technology are applied to the robot 100a, and the robot 100a may be implemented as a guide robot, a transport robot, a cleaning robot, a wearable robot, an entertainment robot, a pet robot, an unmanned flying robot, or the like.

The robot 100a to which the AI technology and the autonomous driving technology are applied may refer to a robot itself having the autonomous driving function or the robot 100a interacting with the autonomous vehicle 100b.

The robot 100a having the autonomous driving function may be collectively referred to as a device that moves for itself along a given route even without user control or moves by determining the route by itself.

The robot 100a having the autonomous driving function and the autonomous vehicle 100b may use a common sensing method to determine at least one of the travel path and the driving plan. For example, the robot 100a having the autonomous driving function and the autonomous vehicle 100b may determine at least one of the travel path and the driving plan by using the information sensed through the lidar, the radar, and the camera.

The robot 100a that interacts with the autonomous vehicle 100b exists separately from the autonomous vehicle 100b. Inside or outside the autonomous vehicle 100b, the robot 100a may perform operations associated with the autonomous driving function of the autonomous vehicle 100b or associated with the user who has ridden on the autonomous vehicle 100b.

Here, the robot 100a that interacts with the autonomous vehicle 100b may control or assist the autonomous driving function of the autonomous vehicle 100b by obtaining the sensor information on behalf of the autonomous vehicle 100b and providing the sensor information to the autonomous vehicle 100b, or by obtaining the sensor information, generating the ambient environment information or the object information, and providing the information to the autonomous vehicle 100b.

Alternatively, the robot 100a that interacts with the autonomous vehicle 100b may monitor the user who has ridden on the autonomous vehicle 100b, or may control the function of the autonomous vehicle 100b through the interaction with the user. For example, when it is determined that the driver is in a drowsy state, the robot 100a may activate the autonomous driving function of the autonomous vehicle 100b or assist the control of the driving unit of the autonomous vehicle 100b. Here, the function of the autonomous vehicle 100b controlled by the robot 100a may include not only the autonomous driving function but also the function provided by a navigation system or an audio system provided within the autonomous vehicle 100b.

Alternatively, outside the autonomous vehicle 100b, the robot 100a that interacts with the autonomous vehicle 100b may provide information to the autonomous vehicle 100b or assist the function of the autonomous vehicle 100b. For example, the robot 100a may provide the autonomous vehicle 100b with traffic information including signal information and the like such as a smart traffic light, and may automatically connect an electric charger to a charging port by interacting with the autonomous vehicle 100b like an automatic electric charger of an electric vehicle.

The AI technology and the XR technology are applied the robot 100a, and the robot 100a may be implemented as a guide robot, a transport robot, a cleaning robot, a wearable robot, an entertainment robot, a pet robot, an unmanned flying robot, a drone, or the like.

The robot 100a to which the XR technology is applied may refer to a robot that is subjected to control/interaction in an XR image. In this case, the robot 100a may be separated from the XR device 100c and interwork with each other.

When the robot 100a which is subjected to control/interaction in the XR image obtains the sensor information from the sensors including a camera, the robot 100a or the XR device 100c may generate the XR image based on the sensor information, and the XR device 100c may output the generated XR image. The robot 100a may operate based on the control signal input through the XR device 100c or based on the user interaction.

For example, the user may check the XR image corresponding to a view of the robot 100a interworking remotely through the external device such as the XR device 100c, may control the autonomous driving path of the robot 100a through the interaction, may control the operation or driving, or may check information on the surrounding objects.

The AI technology and the XR technology are applied the autonomous vehicle 100b, and the autonomous vehicle 100b may be implemented as a mobile robot, a vehicle, an unmanned flying vehicle, or the like.

The autonomous vehicle 100b to which the XR technology is applied, may refer to an autonomous vehicle equipped with a means for providing an XR image or an autonomous vehicle that is subjected to control/interaction in an XR image. Particularly, the autonomous vehicle 100b that is subjected to control/interaction in an XR image may be separated from the XR device 100c and interwork with each other.

The autonomous vehicle 100b equipped with the means for providing an XR image may obtain the sensor information from the sensors including a camera and may output the XR image generated based on the obtained sensor information. For example, the autonomous vehicle 100b may include a HUD to output an XR image, thereby providing a passenger with an XR object corresponding to a real object or an object in the screen.

Here, when the XR object is output to the HUD, at least a part of the XR object may be output to overlap an actual object to which the passenger's gaze is directed. Meanwhile, when the XR object is output to the display provided within the autonomous vehicle 100b, at least a part of the XR object may be output to overlap the object in the screen. For example, the autonomous vehicle 100b may output XR objects corresponding to objects such as a lane, another vehicle, a traffic light, a traffic sign, a two-wheeled vehicle, a pedestrian, a building, and the like.

When the autonomous vehicle 100b that is subjected to control/interaction in the XR image obtains the sensor information from the sensors including a camera, the autonomous vehicle 100b or the XR device 100c may generate the XR image based on the sensor information, and the XR device 100c may output the generated XR image. The autonomous vehicle 100b may operate based on the control signal input through the external device such as the XR device 100c or based on the user interaction.

Figure 4:
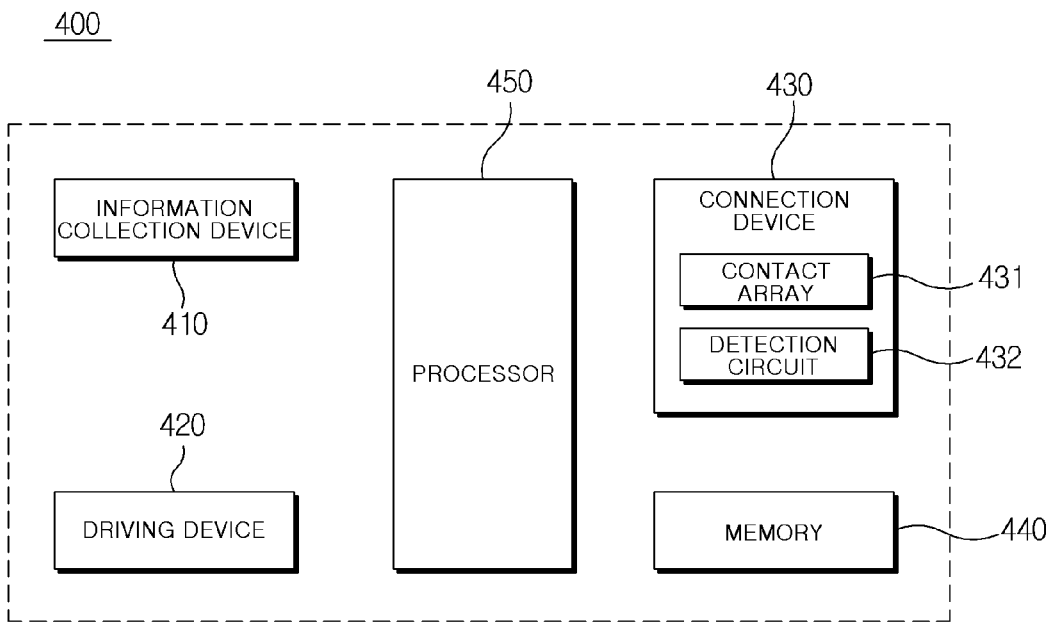
FIG. 4 shows conceptually a modular robot according to the embodiments of the present disclosure.
Figure 5:
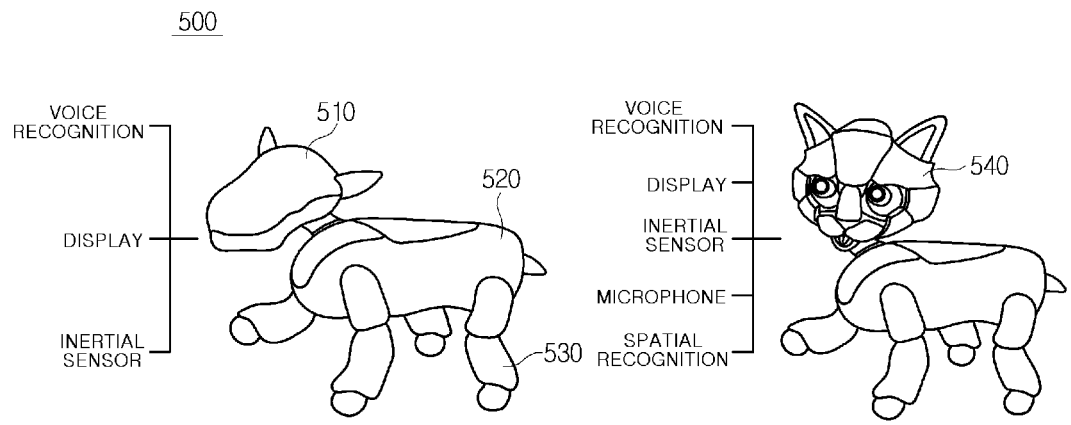
FIG. 5 is a view for describing the modular robot and a module device according to the embodiment of the present disclosure.
Figure 6:
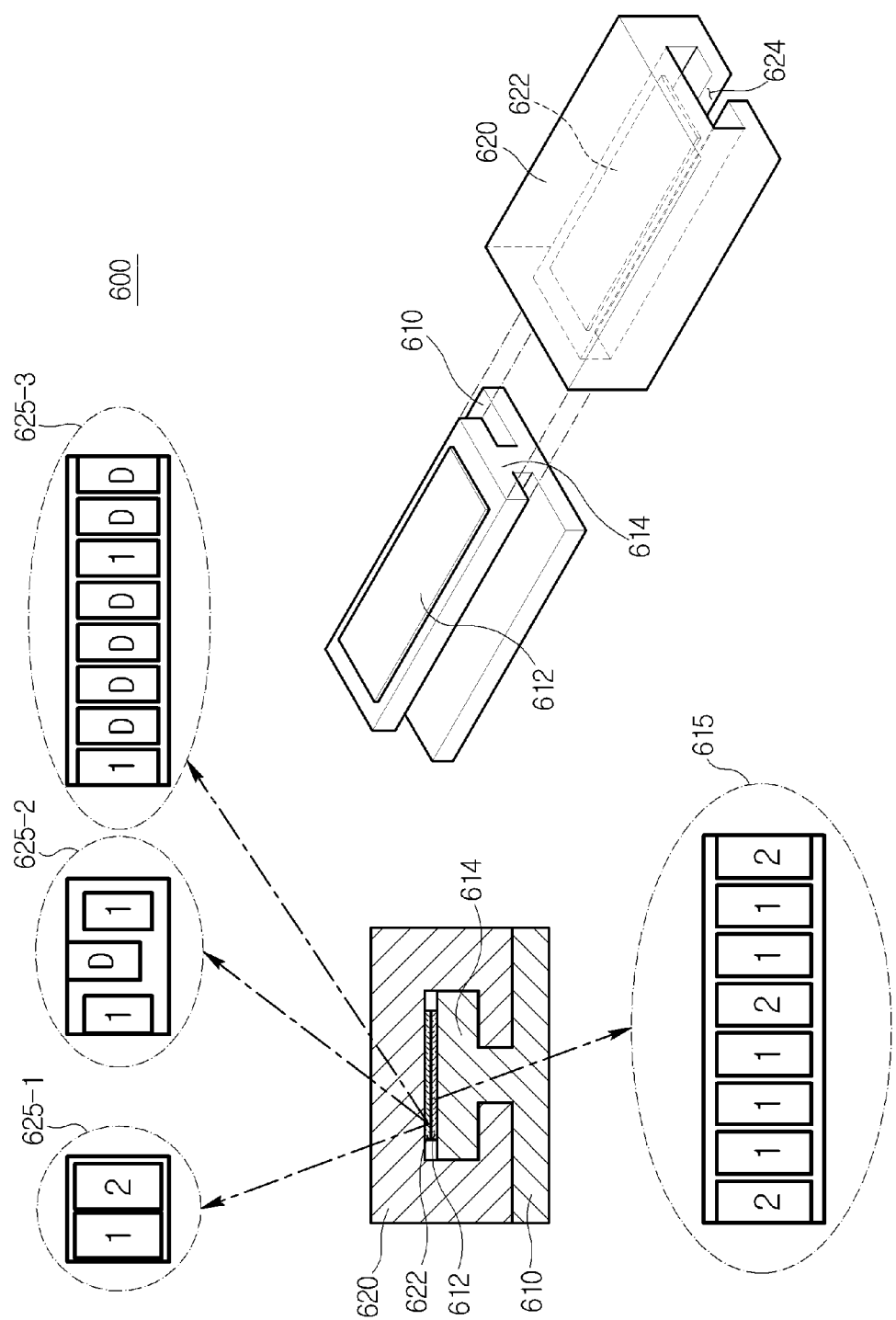
FIG. 6 is a view for describing a coupling of the modular robot and the module device according to various embodiments of the present disclosure.
Figure 7:
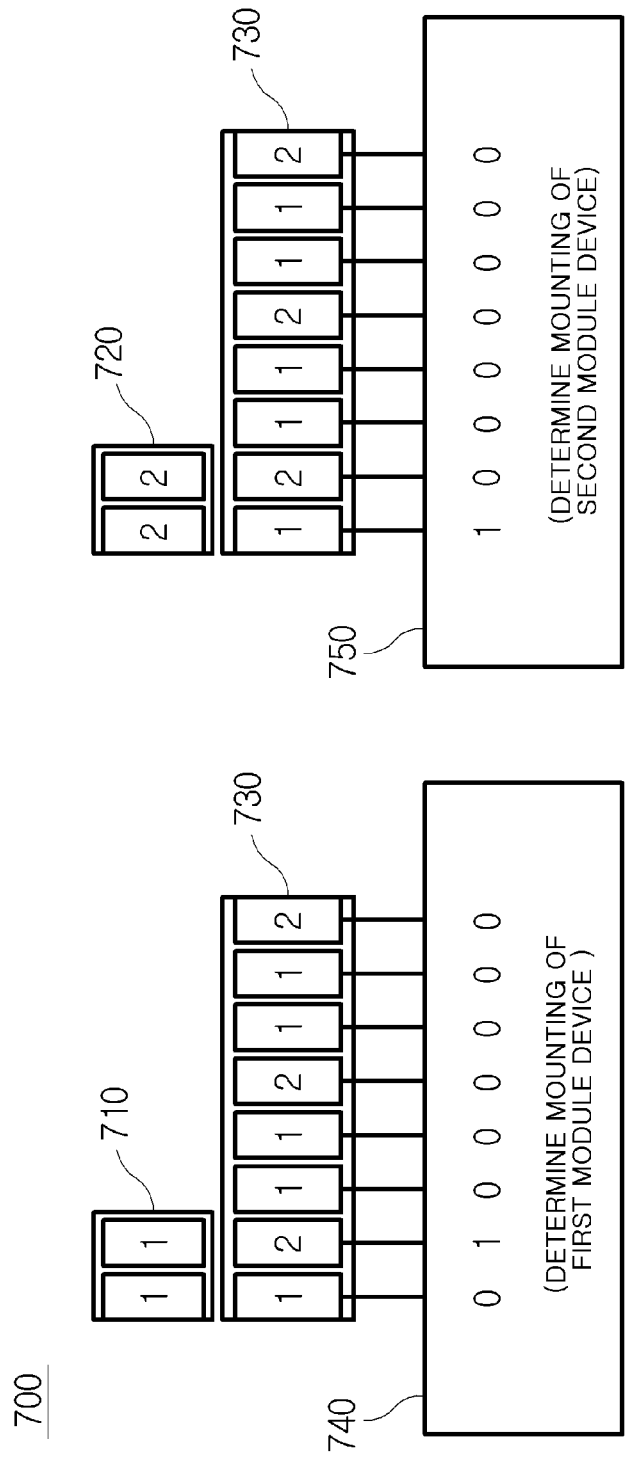
FIG. 7 is a view for describing an operation in which the modular robot according to various embodiments of the present disclosure determines a coupling of the modular robot and the module device.

FIG. 4 shows conceptually a modular robot 400 according to the embodiments of the present disclosure. FIGS. 5 and 6 are views 500 and 600 for describing a coupling of the modular robot 400 and a module device according to various embodiments of the present disclosure. FIG. 7 is a view for describing an operation in which the modular robot 400 according to various embodiments of the present disclosure determines a coupling of the modular robot and the module device. The modular robot 400 shown in FIG. 4 may include a configuration similar to or the same as that of the AI device 100 described above with reference to FIG. 1. For example, referring to FIG. 4, the modular robot 400 may include an information collection device 410, a driving device 420, a connection device 430, a memory 440, and a processor 450. However, this is just an example, and the embodiment of the present disclosure is not limited thereto. For example, at least one of the above-described components of the modular robot 400 may be omitted, or one or more other components (e.g., a microphone, a speaker, a display, etc.) may be added.

The modular robot 400 and the at least one module device 510 (and/or 540) according to various embodiments of the present disclosure may cooperate by coupling with each other, and may be driven as independent entities. According to the embodiment, referring to the example of FIG. 5, a body module 520 including at least one leg module 530 may be referred to as the modular robot 400, and head modules 510 and 540 may be referred to as a first module device 510 and a second module device 540, respectively. The modular robot 400 may be coupled to the first module device 510 and may additionally perform a first function (e.g., a voice recognition function, a display function, and an inertial sensor function) as an extension function in addition to the function of the modular robot 400. Further, the modular robot 400 may be coupled to the second module device 540 and may additionally perform a second function (e.g., a voice recognition function, a display function, an inertial sensor function, a microphone function, and a spatial recognition function) as the extension function in addition to the function of the modular robot 400. However, this is just an example, and the embodiment of the present disclosure is not limited thereto. For example, the leg module 530 described as a component of the modular robot 400 may also be implemented as the module device.

According to various embodiments, each of the modular robot 400 and the module device 510 may include a connection device, and the modular robot 400 and the module device 510 may be coupled to each other by the fastening of the connection device. According to the embodiment, as shown in FIG. 6, a connection device 610 (e.g., a first connection device) of the modular robot 400 includes at least one fastening member 614, and a connection device 620 (e.g., a second connection device) of the module device 510 may include a fastening groove 624 in which the fastening member 614 of the modular robot 400 is seated and fastened in a sliding manner. However, this is just an example, and the embodiment of the present disclosure are not limited thereto. For example, on the contrary, the first connection device 610 of the modular robot 400 includes the fastening groove, and the second connection device 620 of the module device 510 may include the fastening member.

The information collecting device 410 may detect the surrounding environment of the modular robot 400 and generate information on the detected surrounding environment. According to various embodiments, the information collection device 410 may detect a user and generate information (e.g., image data) for identifying the user in accordance with the detection result. According to the embodiment, the information collecting device 410 may include at least one sensor, such as a camera, a lidar, a radar, an ultrasonic sensor, a proximity sensor, an optical sensor, or the like. However, the information collecting device 410 is not limited thereto.

The driving device 420 may generate a driving force for moving the modular robot 400. According to various embodiments, the driving device 420 may be a motor, an actuator, or a steering device, but is not limited thereto. According to the embodiment, the driving device 420 may generate a driving force for the walking or traveling of the modular robot 400. For example, the modular robot 400 includes a traveling device or a walking device, such as a wheel, a belt, a leg, or the like. The robot can move by transmitting the driving force generated by the driving device 420 to the traveling device or the walking device.

The connection device 430 (e.g., the first connection device 610 of FIG. 6) may be configured to enable the modular robot 400 and the at least one module device 510 to be coupled to each other. According to the embodiment, the connection device 430 may include a contact array 431 composed of a plurality of electrodes and a detection circuit 432.

According to the embodiment, the contact array 431 may be composed of a plurality of electrodes providing a magnetic force. For example, as shown in FIG. 6, the modular robot 400 and the module device 510 may be coupled to each other by a magnetic attractive force generated between a first contact array 612 of which at least a portion is exposed through one end (e.g., the fastening member 614) of the modular robot 400 (e.g., the first connection device 610) and a second contact array 622 of which at least a portion is exposed through one end (e.g., the fastening groove 624)) of the module device 510 (e.g., the second connection device 620). For example, one contact array (e.g., the first contact array 612) that forms a magnetic coupling may be formed in a first pattern 615 formed through a combination of a first polarity (e.g., N pole) and a second polarity (e.g., S pole). Another contact array (e.g., the second contact array 622) may be formed in second patterns 625-1, 625-2, and 625-3 formed through a combination of the first polarity and the second polarity. The second patterns 625-1, 625-2, and 625-3 may be used as unique identification information that the module device 510 has. The electrode of the second patterns 625-1, 625-2, and 625-3 may have a polarity opposite to that of the corresponding first pattern in the fastened state. According to the embodiment, the second patterns 625-1 and 625-2 may be formed of electrodes of which the number is smaller than the number of the electrodes formed in the first pattern 615. For example, as shown in FIG. 6, the second pattern may be formed in a continuous electrode pattern (e.g., N pole-S pole) 625-1 or in a discontinuous electrode pattern 625-2. The discontinuous electrode pattern 625-2 may be an electrode pattern (e.g., an N pole-D-N pole) including a dummy electrode D between the electrode and the electrode. According to another embodiment, the second pattern 625-3 may be formed of electrodes of which the number is the same as the number of the electrodes of the first pattern 615. In this case, the rest other than the electrodes may be replaced by dummy electrodes D. For example, the dummy electrode may be formed of a nonpolar material. In this case, the dummy electrode may be used for data transmission.

According to the embodiment, the detection circuit 432 may detect a magnetic contact between the first contact array 612 and the second contact array 622 by the coupling of the modular robot 400 and the module device 510. For example, the magnetic contact may mean the formation of a short circuit through which a current can flow through the electrode of the first contact array 612 and the electrode of the second contact array 622 that are in contact with each other. For example, the detection circuit 432 may be configured to output a first signal (e.g., a high signal) representing the formation of a short circuit to the electrode of the first array 612 in contact with the electrode of the second array 622, and to output a second signal (e.g., a low signal) to the electrode of the first array that is not in contact with the electrode of the second array. According to the embodiment, the detection circuit 432 may be another processor (e.g., a sensor hub) which operates independently of the processor 450, or may be integrated with the processor 450 in accordance with the implementation.

The memory 440 may store various data used by at least one component of the modular robot 400 (e.g., the information collection device 410, the driving device 420, the connection device 430, and the processor 450). According to the embodiment, the memory 440 may store driving information on at least one module device 510. The driving information may be a descriptor describing the identification information and function of the module device 510, a driving method of the module device 510, and the like. According to various embodiments, the memory 440 may include at least one of a nonvolatile memory device and a volatile memory device.

The processor 450 may be configured to control the overall operation of the modular robot 400. According to the embodiment, the processor 450 executes software (e.g., a program) stored in the memory 440 to connect at least one of the components (e.g., the information collection device 410, the driving device 420, and the connection device 430) connected to the processor 450. For example, the processor 450 may include a processor having a calculation processing function. For example, the processor 450 may include a processing unit such as a central processing unit (CPU), a micro-computer unit (MCU), a graphics processing unit (GPU), etc., but is not limited thereto.

According to various embodiments, the processor 450 may control the following operations for recognizing the mounting of the module device 510.

The processor 450 may detect the mounting of the module device 510. According to the embodiment, the processor 450 detects the fastening (or coupling) of the first connection device 610 that is the component of the modular robot 400 and the second connection device 620 that is the component of the module device 510.

The processor 450 may identify the mounted module device 510 in response to the detection of the mounting of the module device 510. According to the embodiment, the processor 450 may identify the type of the mounted module device 510. For example, the processor 450 may check a pattern of an electrode that is in magnetic contact with the electrode (e.g., the second contact array 622) of the second connection device 620 among the electrodes (e.g., the first contact array 612) of the first connection device 610. In addition, the processor 450 may identify the mounted module device 510 based on the driving information corresponding to the checked pattern among the previously stored driving information. The pattern may be checked based on the signal of the detection circuit 432 output by the contact of the first contact array 612 and the second contact array 622. For example, as shown in FIG. 7, based on an output signal 740 (e.g., 01000000) of the detection circuit 432, which means that the second electrode (e.g., the second electrode from the right) of a first array 730 is contacted by a second contact array 710 having a pattern of the first continuous polarities (e.g., N pole), the processor 450 may determine that the first module device is mounted. Also, based on an output signal 750 (e.g., 10000000) of the detection circuit 432, which means that the first electrode (e.g., the first electrode from the right) of a first array 730 is contacted by a second contact array 720 having a pattern of the second continuous polarities (e.g., S pole), the processor 450 may determine that the second module device is mounted.

The processor 450 may perform the extension function by using the module device 510 in response to the identification of the module device 510. The extension function may be a function of the module device 510, which can be controlled by the modular robot 400. According to the embodiment, the processor 450 can check a function that can be performed through the module device 510 based on the driving information corresponding to the identified module device 510, and can control not only the functions of the modular robot 400 but also the functions of the module device 510, in cooperation with the module device 510.

Figure 8:
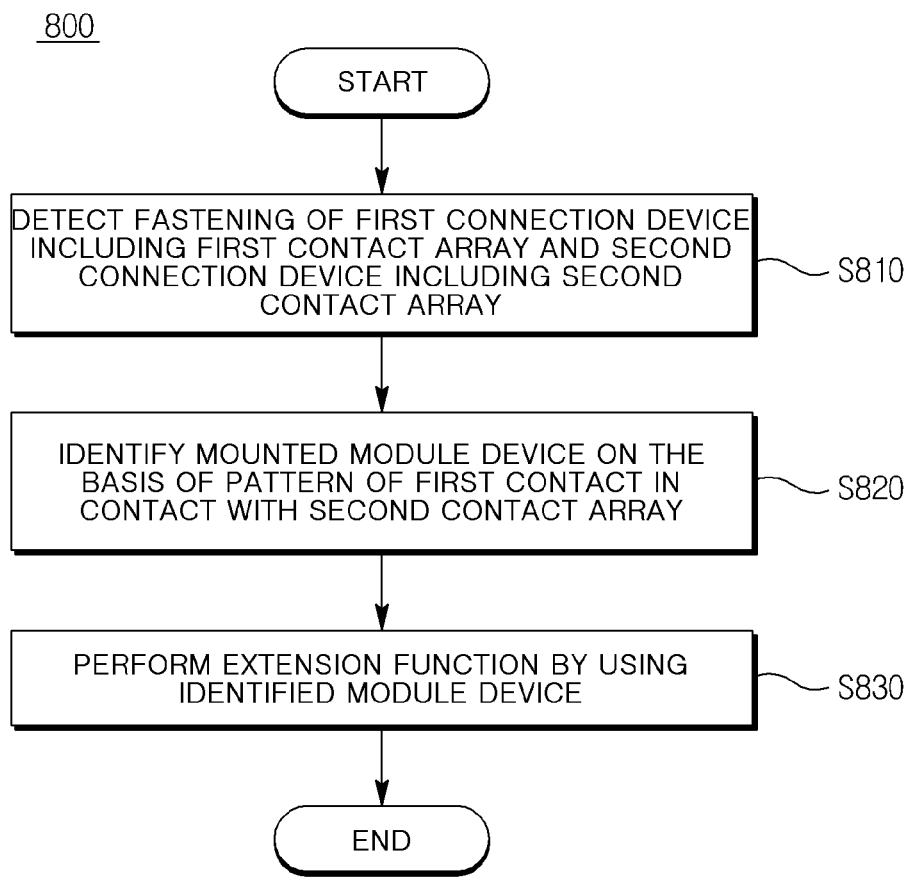
FIG. 8 is a flowchart showing an operation method of the modular robot according to the embodiments of the present disclosure.

FIG. 8 is a flowchart 800 showing an operation method of the modular robot 400 according to the embodiments of the present disclosure. In the following embodiments, each step may be performed sequentially, but is not necessarily performed sequentially. In addition, the following steps may be performed by the processor 450 of the modular robot 400 or may be implemented with instructions that can be executed by the processor 450.

Referring to FIGS. 4 to 8, in step S810, the modular robot 400 according to various embodiments may detect the fastening of the first connection device 610 of the modular robot 400, which includes the first contact array 612 and the second connection device 620 of the module device 510, which includes the second contact array 622. According to the embodiment, in the first contact array 612, a plurality of electrodes providing a magnetic force may be formed in the first pattern 615. In the second contact array 622, a plurality of electrodes providing a magnetic force may be formed in the second pattern (one of 625-1 to 625-3). In addition, some of the electrodes of the first contact array 612 may have a different polarity from that of the electrode of the corresponding second contact array 622. Accordingly, by the fastening of the first connection device 610 and the second connection device 620, the electrode of the first contact array 612 and the electrode of the second contact array 622 which have different polarities may form a magnetic coupling with each other by a magnetic attractive force.

According to various embodiments, in step S820, the modular robot 400 may identify the mounted module device 510 based on the pattern of the first contact array 612 in contact with the second contact array 622. According to the embodiment, the modular robot 400 may check a pattern of an electrode in magnetic contact with the second contact array 622 among the electrodes of the first contact array 612. In addition, the modular robot 400 may identify the module device 510 by obtaining driving information corresponding to the checked pattern among the previously stored driving information. For example, the previously stored driving information may be a descriptor describing the identification information, function, a driving method of the module device, etc., for the module devices 510 and 540 which can be coupled to the modular robot 400.

According to various embodiments, in step S830, the modular robot 400 may perform the extension function by using the module device 510. According to the embodiment, the modular robot 400 may check the driving method and functions that can be performed through the identified module device 510 based on the obtained driving information. Based on this, the modular robot 400 may control the functions of the mounted module device 510.

According to various embodiments, the modular robot 400 may perform an operation to determine whether to be compatible with the identified module device 510, as part of an operation to perform the extension function.

According to the embodiment, the driving information may further include compatibility information related to the module device 510. The compatibility information may include at least one of information on the manufacturer of the module device 510, model information of the module device 510, and information on a control program of the module device 510 (e.g., version information). For example, based on the driving information, the modular robot 400 may determine whether the compatible module device 510 is identified. For example, the modular robot 400 may determine that it is compatible with the module device 510 in response to the identification of the module device 510 corresponding to a predetermined manufacturer or model. In addition, the modular robot 400 may determine that it is not compatible with the module device 510 in response to the identification of the module device 510 that does not correspond to a predetermined manufacturer or model. However, this is just an example, and the embodiment of the present disclosure is not limited thereto. For example, the modular robot 400 may obtain the compatibility information from the identified module device 510.

According to the embodiment, the modular robot 400 may control the function of the mounted module device 510 by using a compatibility control program stored within the modular robot 400 (e.g., the memory 440), in response to the identification of the compatible module device 510.

According to another embodiment, in response to the identification of the module device 510 that is not compatible, the modular robot 400 may obtain the compatibility control program from the outside (e.g., the server 200, the module device 510, etc.), and may control the function of the mounted module device 510 by using the compatibility control program. In addition, even though the module device 510 corresponding to a predetermined manufacturer or model is identified, even when the control program of the module device 510 and the compatibility control program stored in the modular robot 400 are not compatible with each other because, for example, the versions of the two programs are not identical to each other, the modular robot 400 may also obtain the compatibility control program from the outside. Based on at least part of the above-described operation to determine whether to be compatible and the operation to obtain the control program, the modular robot 400 enables coupling with the module device 510 which is not compatible with each other and enables the control of the module device 510.

Figure 9:
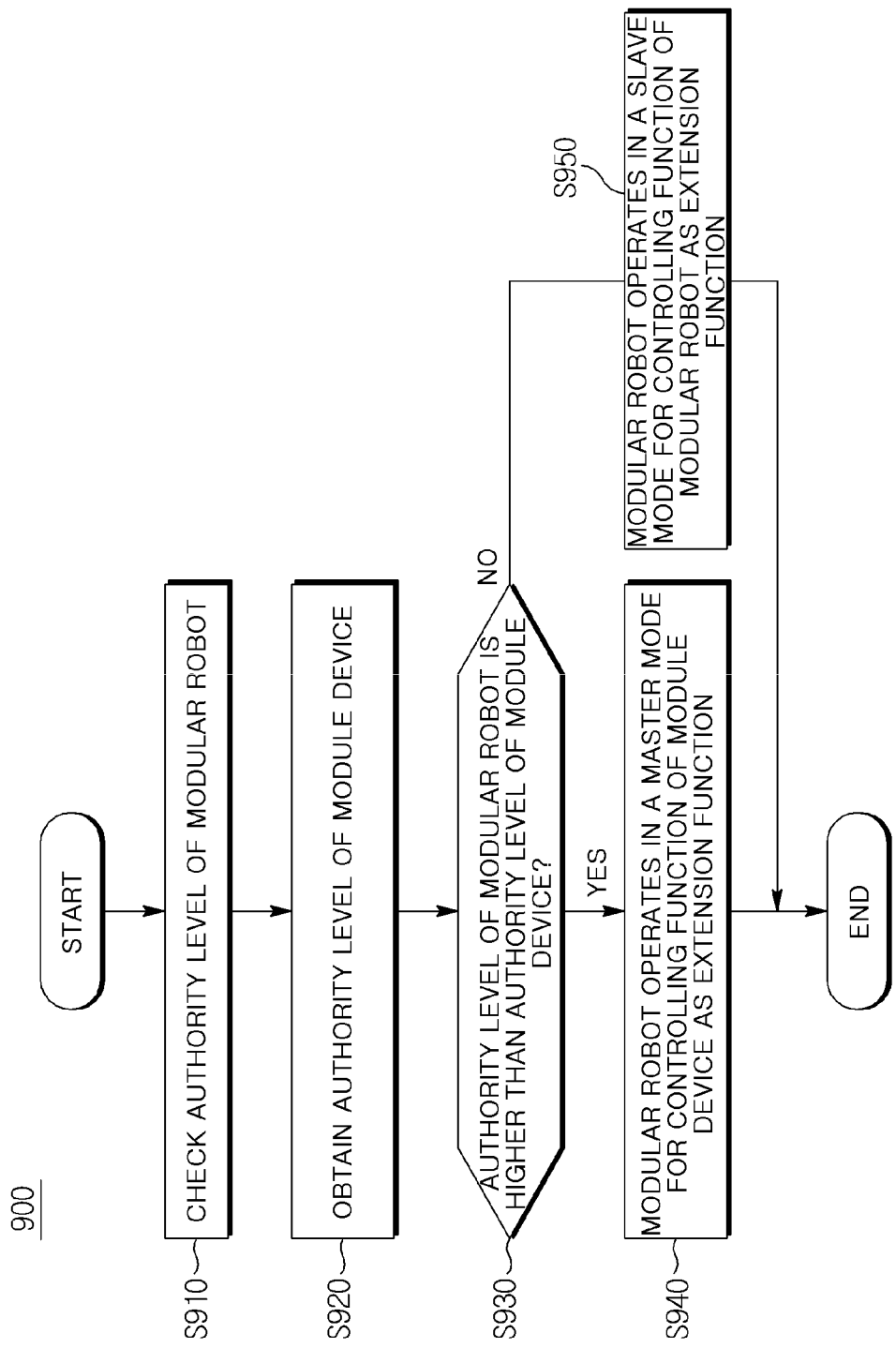
FIG. 9 is a flowchart showing a method for performing an extension function of the modular robot according to the embodiments of the present disclosure.
Figure 10:
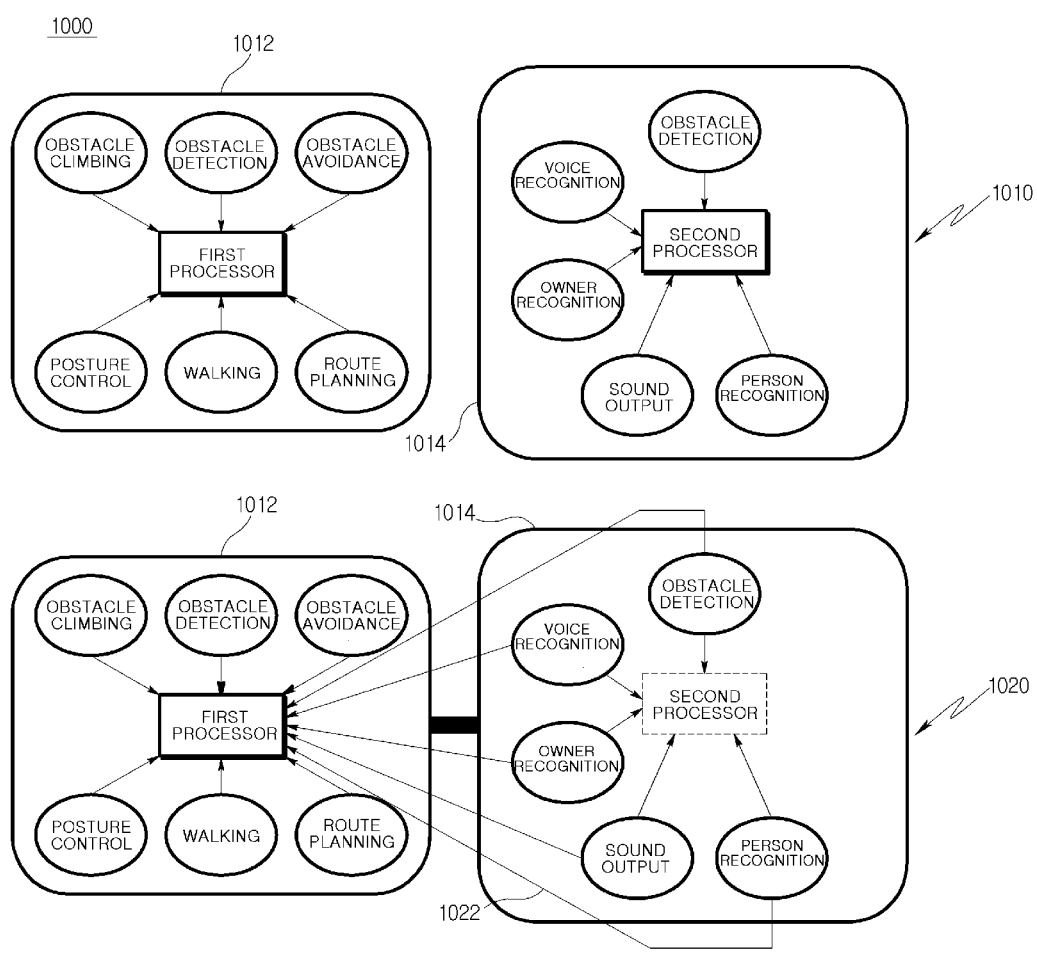
FIG. 10 is a view for describing a master operation of the modular robot according to various embodiments of the present disclosure.

FIG. 9 is a flowchart 900 showing a method for performing the extension function of the modular robot 400 according to the embodiments of the present disclosure. FIG. 10 is a view 1000 for describing an operation of a master mode that the modular robot 400 performs according to various embodiments of the present disclosure. Steps of FIG. 9 described below may represent various embodiment of step S830 of FIG. 8. In addition, in the following embodiments, each step is not necessarily performed sequentially, and may be performed by the processor 450 of the modular robot 400 or may be implemented with instructions that can be executed by the processor 450.

Referring to FIGS. 4 to 9, in step S910, the modular robot 400 according to various embodiments may check an authority level of the modular robot 400. The authority level may have an authority to control the extension function (e.g., the function of the module device 510) when the modular robot 400 and the module device 510 are coupled. According to the embodiment, the authority level may be related to the performance of the modular robot 400, and may be stored within the modular robot 400 (e.g., the memory 440). For example, the authority level of the modular robot 400 having a first level processing capability may be higher than the authority level of the modular robot 400 having a second level processing capability lower than the first level processing capability.

According to various embodiments, in step S920, the modular robot 400 may obtain an authority level of the module device 510. As described above, the authority level of the module device 510 may also be related to the performance of the module device 510. For example, the authority level of the module device 510 having a first level processing capability may be higher than the authority level of the module device 510 having a second level processing capability lower than the first level processing capability. According to the embodiment, the authority level of the module device 510 may be included in the driving information corresponding to the module device 510. In this case, the modular robot 400 may analyze the obtained authority information to obtain the authority level of the module device 510. According to another embodiment, the authority level may be determined based on the identification information included in the driving information. For example, the identification information (e.g., the pattern of the contact array) that may be given to each module device 510 may be divided into a plurality of pattern groups, and each pattern group may be matched with the authority level. For example, when the module device 510 to which a pattern included in a first pattern group is given as the identification information is identified, the modular robot 400 may obtain an authority level having the first level. In addition, when the module device 510 to which a pattern included in a second pattern group is given as the identification information is identified, the modular robot 400 may obtain an authority level having the second level.

According to various embodiments, in step S930, the modular robot 400 may compare the authority level of the modular robot 400 and the authority level of the module device 510.

According to various embodiments, when it is determined that the modular robot 400 has a higher authority level than that of the module device 510, the modular robot 400 may operate in the master mode in step S940. The master mode may be a mode in which the function of the module device 510 can be controlled as the extension function. According to the embodiment, as shown in FIG. 10, when the modular robot 400 performing a first function 1012 has a higher authority level than that of the module device 510 performing a second function 1014 (1010), the modular robot 400 may operate in the master mode. In addition, optionally, the modular robot 400 may direct the operation in a slave mode to the coupled module device 510. Due to this, a control authority for controlling the second function 1014 of the module device 510 may be transferred to the processor (e.g., a first processor) of the modular robot 400 (1022), and the processor (e.g., a second processor) of the module device 510 may be deactivated (or switched to a low power mode) (1020). According to the embodiment, at least one of the modular robot 400 and the module device 510 may provide information indicating the transfer of the control authority. Information indicating the transfer of the control authority may be provided in various ways by using a display, a speaker, an LED, and the like.

According to various embodiments, when it is determined that the modular robot 400 has a lower authority level than that of the module device 510, the modular robot 400 may operate in the slave mode in step S950. The slave mode may be a mode in which the first function 1012 of the modular robot 400 is controlled by the module device 510 operating in the master mode. According to the embodiment, the modular robot 400 may transfer the control authority of the first function 1012 that can be performed by the modular robot 400 itself to the module device 510, and may perform a function corresponding to a control command received from the module device 510. Here, the processor (e.g., the first processor) of the modular robot 400 operating in the slave mode may be changed into an inactive state.

Figure 11:
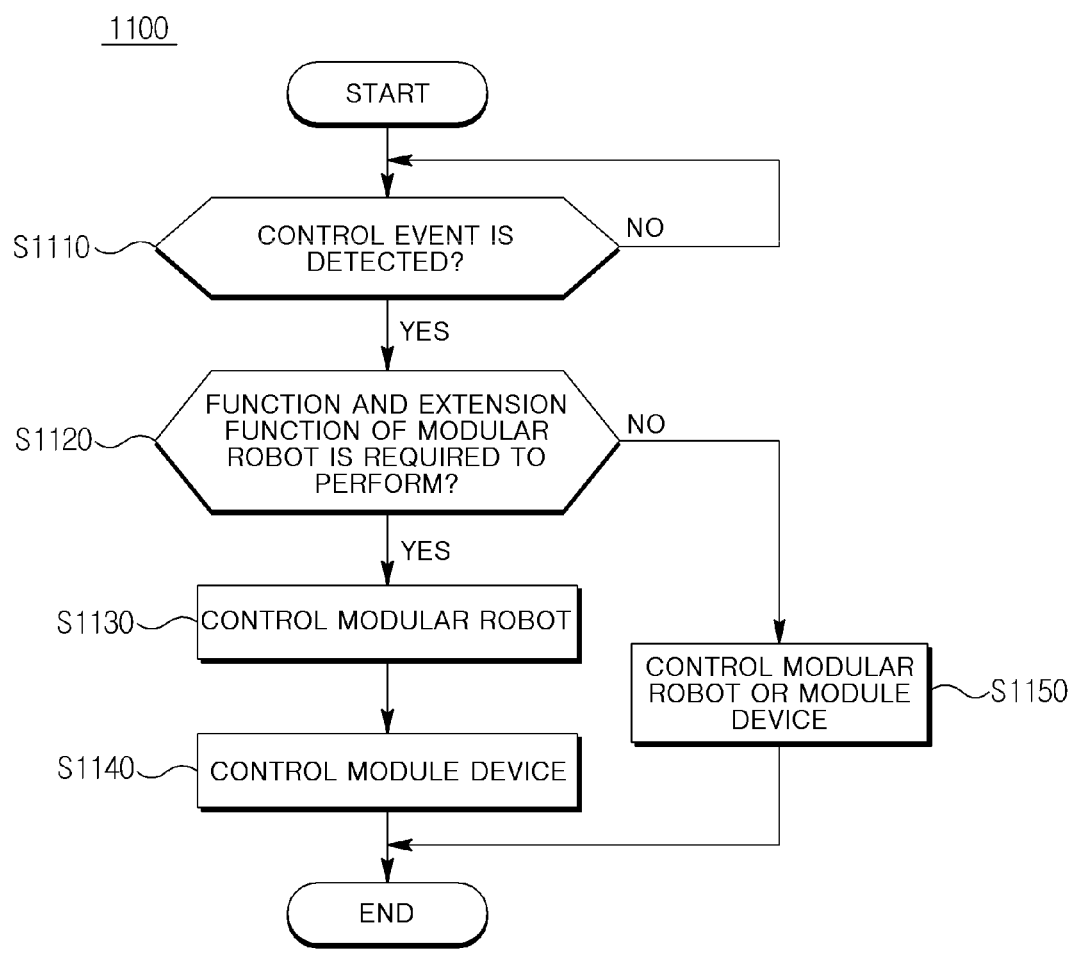
FIG. 11 is a flowchart showing a method in which the modular robot according to the embodiments of the present disclosure controls the extension function.

FIG. 11 is a flowchart 1100 showing a method in which the modular robot 400 according to the embodiments of the present disclosure controls the extension function. Steps of FIG. 11 described below may represent various embodiments of step S940 of FIG. 9. In addition, in the following embodiment, each step is not necessarily performed sequentially, and may be performed by the processor 450 of the modular robot 400 or may be implemented with instructions that can be executed by the processor 450.

Referring to FIGS. 4 to 11, in step S1110, the modular robot 400 according to various embodiments of the present disclosure may determine whether a control event is detected or not. According to the embodiment, the control event may be related to a situation in which at least one function that can be performed through the modular robot 400 and the module device 510 is performed. For example, the modular robot 400 may detect the control event based on information collected through the information collection device 410. For another example, the modular robot 400 may also detect the control event based on the voice utterance obtained from the user. For example, the voice utterance may include a wake-up utterance (e.g., hey CLOi) which activates the service of the modular robot 400 (and the module device 510) or directs a call for the service and/or a control utterance (e.g., bring something in front of the door) which directs the operation of the hardware/software configuration included in the modular robot 400 (and the module device 510).

In step S1120, the modular robot 400 according to various embodiments may determine whether it is required to perform the function and the extension function of the modular robot 400. The modular robot 400 may determine whether the function of the modular robot 400 and the function of the module device 510 should be performed together for control event processing. For example, the modular robot 400 may analyze the pre-stored driving information, thereby performing the above-described determination operation.

According to various embodiments, in response to the determination of a situation in which the function of the modular robot 400 and the function of the module device 510 should be performed together, the modular robot 400 may perform the control operation according to a priority such as steps S1130 and S1140. According to the embodiment, the modular robot 400 may preferentially control the modular robot 400 in step S1130 and then may control the module device 510 in step S1140.

According to various embodiments, in response to the determination of a situation in which the function of the modular robot 400 or the function of the module device 510 should be performed independently, the modular robot 400 may select and control one of the modular robot 400 and the module device 510 in step S1150.

Figure 12:
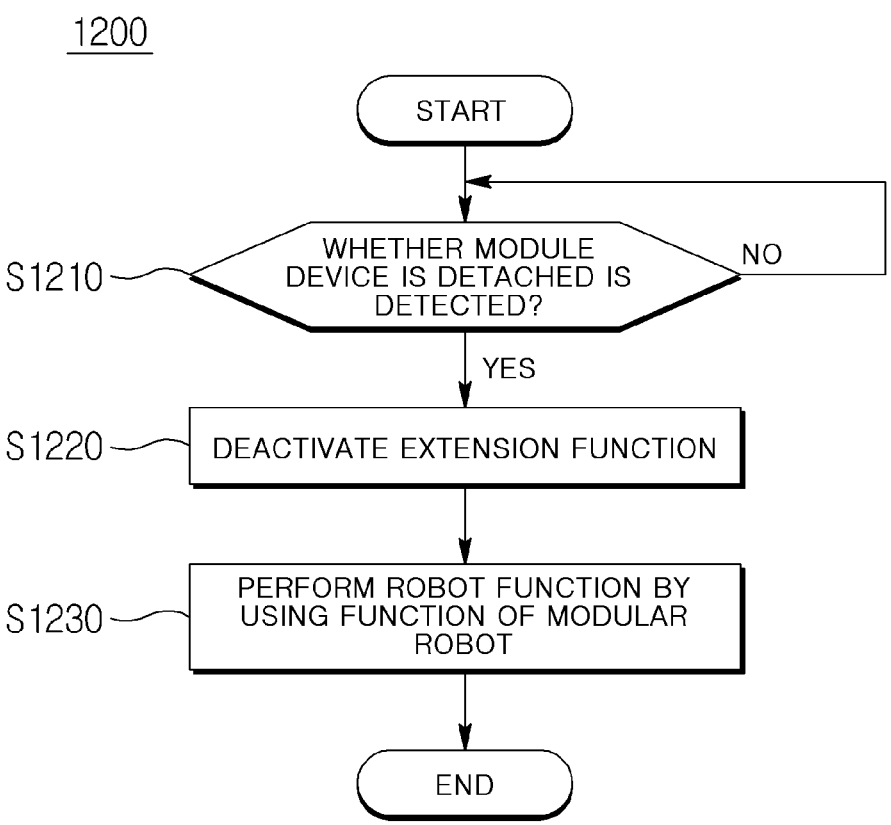
FIG. 12 is a flowchart showing another method for performing the extension function of the modular robot according to the embodiments of the present disclosure.
Figure 13:
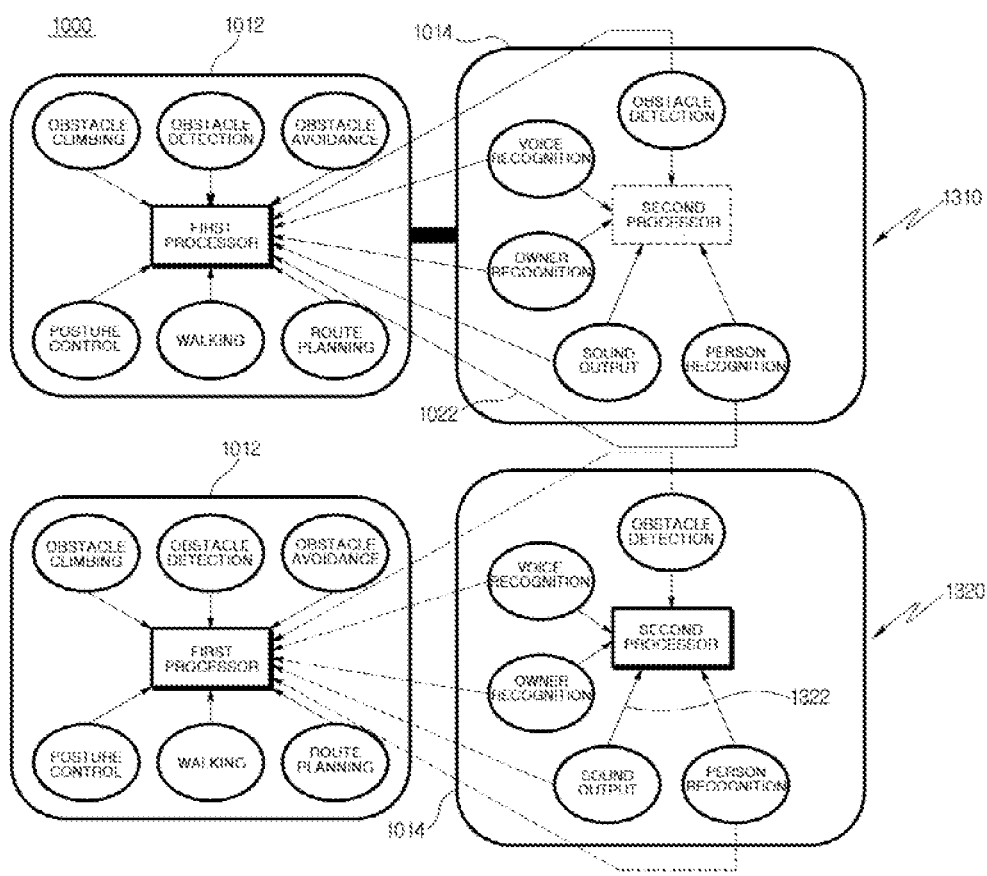
FIG. 13 is a view for describing an operation to release a master mode of the modular robot according to various embodiments of the present disclosure.

FIG. 12 is a flowchart 1200 showing another method for performing the extension function of the modular robot 400 according to the embodiments of the present disclosure. FIG. 13 is a view for describing an operation to release a master mode of the modular robot 400 according to various embodiments of the present disclosure. Steps of FIG. 12 described below may represent various embodiment of step S830 of FIG. 8. In addition, in the following embodiments, each step is not necessarily performed sequentially, and may be performed by the processor 450 of the modular robot 400 or may be implemented with instructions that can be executed by the processor 450.

Referring to FIGS. 4 to 12, in step S1210, the modular robot 400 according to various embodiments may detect whether the module device 510 is attached or detached. The attachment and detachment of the module device 510 may mean the formation of an open circuit by a short circuit of the first contact array 612 (e.g., the contact array of the first connection device 610) and the second contact array 622 (e.g., the first connection device 620).

According to various embodiments, in response to the detection of the attachment and detachment of the module device 510, the modular robot 400 may deactivate the extension function in step S1220. According to the embodiment, the modular robot 400 may activate only its own function and deactivate the function of the module device 510, which is performed in cooperation with the modular robot. Here, as shown in FIG. 13, the control authority 1014 of the module device 510 transferred to the modular robot 400 may be returned to the module device 510 1322). Due to this, the processor (e.g., the second processor) of the module device 510 is switched from the deactivated state 1310 to the activated state 1320, so that the module device 510 can operate as an independent entity. According to the embodiment, at least one of the modular robot 400 and the module device 510 may provide information indicating the return of the control authority. The information indicating the return of the control authority may be provided in various ways by using a display, a speaker, an LED, and the like.

In response to the detection of the attachment and detachment of the module device 510, the modular robot 400 according to various embodiments may perform a robot function by using the function of the modular robot 400 in step S1230. According to the embodiment, the modular robot 400 may detect the control event and perform a function corresponding to the control event.

A modular robot (e.g., the modular robot 400) according to various embodiments includes: a first connection device (e.g., the first connection device 610) including a first contact array (e.g., the first contact array 612) composed of at least one electrode; a driving device (e.g., the driving device 420) which is configured to implement movement of the modular robot; and a processor (e.g., the processor 450) which is configured to control the first connection device and the driving device. The processor may be configured to control such that the modular robot detects fastening of the first connection device and a second connection device (e.g., the second connection device 620) of a module device (e.g., the module device 510) including a second contact array (e.g., the second contact array 622) composed of at least one electrode, identifies the module device based on a contact pattern of the first contact array in contact with the second contact array, and controls at least one of functions of the driving device and the module device based on the identification.

According to various embodiments, one of the first connection device and the second connection device may include a fastening member, and the other of the first connection device and the second connection device may include a fastening groove in which the fastening member is seated and fastened in a sliding manner.

According to various embodiments, the at least one electrode of the first contact array and the at least one electrode of the second contact array may be provided as a magnetic material which allows the electrodes to be coupled to each other by a magnetic force.

According to various embodiments, the first contact array may be formed in a first electrode pattern formed through a combination of a first polarity and a second polarity, and the second contact array may be formed in a second electrode pattern different from the first electrode pattern.

According to various embodiments, the second electrode pattern may be used as identification information of the module device.

According to various embodiments, the modular robot may further include a detection circuit (e.g., the detection circuit 432) connected to the first contact array and configured to detect a magnetic contact between the first contact array and the second contact array. The processor may be configured such that the modular robot checks, based on an output of the detection circuit, an electrode in contact with the second contact array among the electrodes of the first contact array.

According to various embodiments, the modular robot may further include a memory (e.g., the memory 440) configured to store driving information on at least one module device. The processor may be configured such that the modular robot identifies the module device based on the driving information corresponding to the contact pattern among the stored driving information. According to the embodiment, the driving information may include at least one of identification information and functions of the module device and a driving method of the module device.

According to various embodiments, the processor may be configured such that the modular robot performs a master mode or a slave mode based on an authority level of the identified module device. According to the embodiment, the master mode may be a mode for obtaining a control authority of the module device, and the slave mode may be a mode for transferring the control authority of the modular robot to the module device.

According to various embodiments, the processor may be configured such that the modular robot performs a function of the modular robot, which corresponds to a control command received from the module device, during a period of time when the modular robot operates in the slave mode.

According to various embodiments, the processor may be configured such that the modular robot detects whether the module device is attached or detached during a period of time when the modular robot operates in the master mode, returns the control authority of the module device in response to the detection of the attachment and detachment of the module device, and indicates the return of the control authority.

According to various embodiments, the processor may be configured such that the modular robot determines whether to be compatible with the module device based on compatibility information related to the module device, obtains a control program for controlling the module device from the outside when the modular robot is determined not to be compatible with the module device, and controls the module device based on the obtained control program. For example, the compatibility information may include at least one of information on a manufacturer of the module device, model information of the module device, and information on the control program of the module device.

An operation method of the modular robot according to various embodiments includes detecting fastening of a first connection device of the modular robot, which includes a first contact array, and a second connection device of a module device, which includes a second contact array; identifying the module device based on a contact pattern of the first contact array in contact with the second contact array; and controlling at least one of a function of the modular robot and a function of the module device based on the identification.

According to various embodiments, the detecting fastening may include detecting that a fastening member included in one of the first connection device and the second connection device is fastened in a sliding manner to a fastening groove included in the other of the first connection device and the second connection device.

According to various embodiments, the first contact array and the second contact array may include one or more electrodes which can be coupled to each other by a magnetic force.

According to various embodiments, the first contact array may be formed in a first electrode pattern formed through a combination of a first polarity and a second polarity, and the second contact array may be formed in a second electrode pattern different from the first electrode pattern.

According to various embodiments, the second electrode pattern may be used as identification information of the module device.

According to various embodiments, the identifying the module device may include checking the contact pattern based on an electrode in contact with the second contact array among the electrodes of the first contact array.

According to various embodiments, the identifying the module device may include identifying the module device based on driving information corresponding to the contact pattern among the driving information stored in the modular robot. According to the embodiment, the driving information may include at least one of identification information and functions of the module device and a driving method of the module device.

According to various embodiments, the controlling may include performing a master mode or a slave mode based on an authority level of the identified module device. The master mode may be a mode for obtaining a control authority of the module device. The slave mode may be a mode for transferring the control authority of the modular robot to the module device.

According to various embodiments, the controlling may include performing the function of the modular robot, which corresponds to a control command received from the module device, during a period of time when the modular robot operates in the slave mode.

According to various embodiments, the controlling may include detecting whether the module device is attached or detached during a period of time when the modular robot operates in the master mode, returning the control authority of the module device in response to the detection of the attachment and detachment of the module device, and indicating the return of the control authority.

According to various embodiments, the controlling may include determining whether to be compatible with the module device based on compatibility information related to the module device, obtaining a control program for controlling the module device from the outside when the modular robot is determined not to be compatible with the module device, and controlling the module device based on the obtained control program. For example, the compatibility information may include at least one of information on a manufacturer of the module device, model information of the module device, and information on the control program of the module device.

The modular robot 400 and the operation method thereof according to embodiments of the present disclosure may be implemented with instructions which are stored in a computer-readable storage medium and executed by the processor 450.

Directly and/or indirectly and regardless of whether the storage medium is in a raw state, in a formatted state, an organized state, or in any other accessible state, the storage medium may include a relational database, a non-relational database, an in-memory database, and a database which can store a data and include a distributed type database, such as other suitable databases that allows access to the data through a storage controller. In addition, the storage medium includes a primary storage device, a secondary storage device, a tertiary storage device, an offline storage device, a volatile storage device, a nonvolatile storage device, a semiconductor storage device, a magnetic storage device, an optical storage device, and a flash storage devices, a hard disk drive storage device, a floppy disk drive, a magnetic tape, or any type of storage device such as other suitable data storage medium.

Although the present disclosure has been described with reference to the embodiment shown in the drawings, this is just an example and it will be understood by those skilled in the art that various modifications and equivalent thereto may be made. Therefore, the true technical scope of the present disclosure should be determined by the spirit of the appended claims.

What is claimed is:

1. A modular robot comprising:
   a first connection device including a first contact array composed of at least one electrode;
   a driving device configured to implement movement of the modular robot; and
   a processor configured to:
   control the first connection device and the driving device,
   detect fastening of the first connection device with a second connection device of a module device, the second connection device including a second contact array composed of at least one electrode, and
   in response to identifying the module device based on a contact pattern formed based on the first contact array being in contact with the second contact array, activate at least one of a function of the driving device or a function of the module device.

2. The modular robot of claim 1, wherein one of the first connection device and the second connection device comprises a fastening member, and
   wherein another one of the first connection device and the second connection device comprises a fastening groove configured to seat and fasten the fastening member in a sliding manner.

3. The modular robot of claim 1, wherein the at least one electrode of the first contact array and the at least one electrode of the second contact array include magnetic material for coupling with each other by a magnetic force.

4. The modular robot of claim 3, wherein the first contact array has a first electrode pattern formed through a combination of a first polarity and a second polarity, and
wherein the second contact array has a second electrode pattern different from the first electrode pattern.

5. The modular robot of claim 4, wherein the second electrode pattern corresponds to identification information of the module device.

6. The modular robot of claim 1, further comprising:
a detection circuit connected to the first contact array and configured to detect a magnetic contact between the first contact array and the second contact array,
wherein the processor is further configured to determine whether an electrode in the first contact array is in contact with an electrode in the second contact array based on an output of the detection circuit.

7. The modular robot of claim 1, further comprising:
a memory configured to store driving information for one or more module devices,
wherein the processor is further configured to identify the module device based on the contact pattern corresponding to specific driving information among the driving information, and
wherein the specific driving information comprises identification information and functions of the module device, or a driving method of the module device.

8. The modular robot of claim 1, wherein the processor is further configured to:
control the modular robot to operate in a master mode or a slave mode based on an authority level of the module device, and
wherein the master mode is a mode for obtaining a control authority of the module device, and the slave mode is a mode for transferring a control authority of the modular robot to the module device.

9. The modular robot of claim 8, wherein the processor is further configured to:
in response to receiving a control command from the module device while the modular robot is in the slave mode, execute a function of the modular robot based on the control command.

10. The modular robot of claim 1, further comprising:
a memory configured to store compatibility information for the module device, the compatibility information including at least one of information on a manufacturer of the module device, model information of the module device, or information on a control program for the module device,
wherein the processor is further configured to:
determine whether the modular robot is compatible with the module device based on the compatibility information, and
obtain the control program for controlling the module device from an external source when the modular robot is determined not to be compatible with the module device.

11. A method for controlling a modular robot, the method comprising:
detecting fastening of a first connection device of the module robot with a second connection device of a module device, the first connection device including a first contact array composed of at least one electrode and the second connection device including a second contact array composed of at least one electrode; and
in response to identifying the module device based on a contact pattern formed based on the first contact array being in contact with the second contact array, activating at least one of a function of the modular robot or a function of the module device.

12. The method of claim 11, wherein the detecting the fastening comprises:
determining that a fastening member comprised in one of the first connection device and the second connection device is fastened in a sliding manner to a fastening groove comprised in another one of the first connection device and the second connection device.

13. The method of claim 11, wherein the at least one electrode of the first contact array and the at least one electrode of the second contact array include magnetic material for coupling with each other by a magnetic force.

14. The method of claim 13, wherein the first contact array has a first electrode pattern formed through a combination of a first polarity and a second polarity, and
wherein the second contact array has a second electrode pattern different from the first electrode pattern.

15. The method of claim 14, wherein the second electrode pattern corresponds to identification information of the module device.

16. The method of claim 13, wherein the identifying the module device comprises determining that an electrode in the first contact array is in contact with an electrode in the second contact array.

17. The method of claim 11, wherein the identifying the module device comprises identifying the module device based on the contact pattern corresponding to specific driving information among driving information stored in the modular robot, and
wherein the specific driving information comprises information and functions of the module device, or a driving method of the module device.

18. The method of claim 11, further comprising:
controlling the modular robot to operate in a master mode or a slave mode based on an authority level of the module device,
wherein the master mode is a mode for obtaining a control authority of the module device, and the slave mode is a mode for transferring a control authority of the modular robot to the module device.

19. The method of claim 18, further comprising:
in response to receiving a control command from the module device while the modular robot is in the slave mode, executing a function of the modular robot based on the control command.

20. The method of claim 11, further comprising:
storing, in a memory of the modular robot, compatibility information for the module device, the compatibility information including at least one of information on a manufacturer of the module device, model information of the module device, or information on a control program for the module device;
determining whether the modular robot is compatible with the module device based on the compatibility information;
obtaining a control program for controlling the module device from an external source when the modular robot is determined not to be compatible with the module device; and
controlling a function of the module device based on the control program.

* * * * *